(12) United States Patent
Toyoda et al.

(10) Patent No.: US 6,816,911 B1
(45) Date of Patent: Nov. 9, 2004

(54) RELAY APPARATUS AND RELAY METHOD

(75) Inventors: Kiyoshi Toyoda, Kunitachi (JP); Masao Akimoto, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 790 days.

(21) Appl. No.: 09/708,721

(22) Filed: Nov. 9, 2000

(30) Foreign Application Priority Data

May 16, 2000 (JP) ........................................ 2000-142708

(51) Int. Cl.[7] .......................................... G06F 15/173
(52) U.S. Cl. ........................ 709/238; 709/246; 709/206
(58) Field of Search ................................ 709/238, 246, 709/206; 358/1.15

(56) References Cited

U.S. PATENT DOCUMENTS

| | | | |
|---|---|---|---|
| 6,088,125 A | | 7/2000 | Okada et al. |
| 6,470,379 B1 | * | 10/2002 | Mori .......................... 709/206 |
| 6,671,063 B1 | * | 12/2003 | Iida ........................... 358/1.15 |

FOREIGN PATENT DOCUMENTS

| | | |
|---|---|---|
| JP | 9-8980 | 1/1997 |
| JP | 10341252 | 12/1998 |
| JP | 1141406 | 2/1999 |
| JP | 11112716 | 4/1999 |
| JP | 11154968 | 6/1999 |
| JP | 11164077 | 6/1999 |
| JP | 11289375 | 10/1999 |
| JP | 2000-90022 | 3/2000 |

OTHER PUBLICATIONS

Partial English Language Translation of JP Appln. No. 11–112716.
Partial English Language Translation of JP Appln. No. 11–154968.
Partial English Language Translation of JP Appln. No. 11–41406.
Partial English Language Translation of JP Appln. No. 9–8980.
Partial English Language Translation of JP Appln. No. 2000–90022.
English Language Abstract of JP Appln. No. 11–164077.
English Language Abstract of JP Appln. No. 11–289375.
English Language abstract of JP–10–341252.
McIntyre et al., "File Format for Internet Fax", RFC 2301, Mar. 1998.

* cited by examiner

Primary Examiner—Mehmet B. Geckil
(74) Attorney, Agent, or Firm—Greenblum & Bernstein, P.L.C.

(57) ABSTRACT

A facsimile control section detects whether or not a transmission destination is busy. When the busy state is detected, the facsimile control section notifies a busy notification mail generating section that the busy state has been detected. In accordance with this notification, the busy notification mail generating section generates a busy notification mail and instructs a mail transmitting section to transmit the generated mail. Thereafter, the facsimile control section executes a retry of facsimile transmission to a facsimile apparatus of transmission destination. This makes it possible for a request source, which is placed at a remote site and the like, to easily recognize whether or not a relay apparatus is retrying.

25 Claims, 16 Drawing Sheets

BUSY NOTIFICATION MESSAGE

\*\*\*\*\*\*\*\*\*\*\*\*\* -COMM. JOUNAL - \*\*\*\*\*\*\*\*\*\*\*\*\*\*\*\*\*\*\*\* DATE SEP-12-1999 \*\*\*\* TIME 15:00 \*\*\*\* P.01

(1)            (2)              (3)
MODE = RELAYED TRANSMISSION    START= SEP-12 15:00   END= SEP-12 15:00

FILE NO.=183  (4)

(5)   (6)       (7)
STN   COMM.  ONE-TOUCH   STATION NAME/E-MAIL ADDRESS/TELEPHONE NO.   Retry
NO.          ABBR NO.
001    OK      4681111234                                    001
002    BUSY    3961111234                                    001

- PANASONIC -

\*\*\*\*\*\*\*\*\*\*\*\*\*\*\*\*\*\*\*\*\*\*\*\*\*\*\*\*\*\*\* - HEAD OFFICE   - 2-1 555-1212 - \*\*\*\*\*\*\*\*

FIG.6

```
RESULT NOTIFICATION MESSAGE
**************-COMM. JOUNAL-********************** DATE SEP-12-1999 **** TIME 15:00 **** P.01

(1)                          (2)                    (3)
MODE = RELAYED TRANSMISSION     START= SEP-12 15:00   END= SEP-12 15:00

FILE NO.=050  (4)

(5)   (6)       (7)                    (8)                          (9)
STN   COMM.   ONE-TOUCH     STATION NAME/E-MAIL ADDRESS/TELEPHONE NO.   PAGES
DURATION
NO.           ABBR NO.
001   R-OK                  4681111234                                001/001   00:00:15
002   R-OK                  3961111234                                001/001   00:00:15

- PANASONIC -
*******************************************-HEAD OFFICE  -2-1 555-1212 - *********
```

FIG.7

RELAY APPARATUS AND RELAY METHOD

BACKGROUND OF THE INVENTION

1. Field of the Invention

The present invention relates to a relay apparatus for relaying image information from a terminal on a computer network to a facsimile apparatus on a telephone network, and relates to a relay method.

2. Description of the Related Art

Relay apparatuses for relaying image information and the like from the Internet to the telephone network are conventionally developed. In a case of transmitting image information to a facsimile apparatus placed at a remote site through a PSTN (public switched telephone network), image information is sent to a relay apparatus located at an area where facsimile apparatuses are provided over the Internet according to an e-mail communication procedure, and the image information is transmitted to the facsimile apparatus from this relay apparatus via PSTN according to a facsimile procedure. This allows a large reduction in communication cost.

Moreover, in a local area network (LAN) and the like, one relay apparatus is used in common among a plurality of personal computers (PCs) in some cases. Namely, a relay apparatus for connecting LAN and PSTN is provided. Then, image information is transferred from PC to the relay apparatus via LAN according to the e-mail communication procedure, and the relay apparatus transmits image information to the facsimile apparatus via PSTN according to the facsimile procedure.

When a transmission destination is busy, a general facsimile apparatus executes a retry operation in which a call is once stopped and the call is originated again after a predetermined period of time. The conventional relay apparatus performs the retry operation in the similar way.

As mentioned above, a request source requests the relay apparatus to carry out the relay using e-mail. Since the relay apparatus is generally provided at a remote site, the request source does not recognize whether or not the relay apparatus is retrying.

Moreover, since the request source cannot control the relay apparatus, it cannot stop the retry. A cause for the occurrence of retry is that the transmission destination is a telephone since the transmission destination facsimile number is wrong. In such a case, since the request source cannot control the relay apparatus, the request source can neither stop the retry of relay nor avoid trouble in an erroneous calling.

In not only a case in which the relay apparatus is provided at the remote site but also a case in which a plurality of terminals shares the relay apparatus on the same premises, the PC operator must move to the relay apparatus in order to confirm the occurrence of retry or to stop the retry.

SUMMARY OF THE INVENTION

The present invention has been made as taking the above-mentioned problem into account, and an object of the present invention is to provide a relay apparatus and a relay method that is capable of easily recognizing as to whether or not the relay apparatus is retrying at a request source, which is placed at a remote site.

Moreover, another object of the present invention is to provide a relay apparatus and a relay method that is capable of stopping a retry for relay easily and correctly at a request source.

In order to solve the aforementioned problem, the present invention is designed to transmit a retry notification e-mail message, which notifies that transmission of facsimile data is retrying, to the request source that has requested the relay of an e-mail message over a computer network.

According to the present invention, it is possible for the request source to easily recognize that the relay apparatus is retrying even if the request source is remote from the relay apparatus.

Furthermore, the present invention is designed to stop a retry operation in accordance with an instruction from a request source that has received a retry notification e-mail message.

According to the present invention, it is possible for the request source to easily stop the retry operation of relay apparatus even if the request source is remote from the relay apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 6 is a view showing one example of a busy notification mail transmitted by the relay apparatus according to the first embodiment of the present invention;

FIG. 7 is a view showing one example of a relay result notification mail transmitted by the relay apparatus according to the first embodiment;

DETAILED DESCRIPTION OF THE PREFERRED EMBODIMENTS

First to fourth embodiments will be specifically explained with reference to FIGS. 1 to 16.

(First Embodiment)

Figure 1:
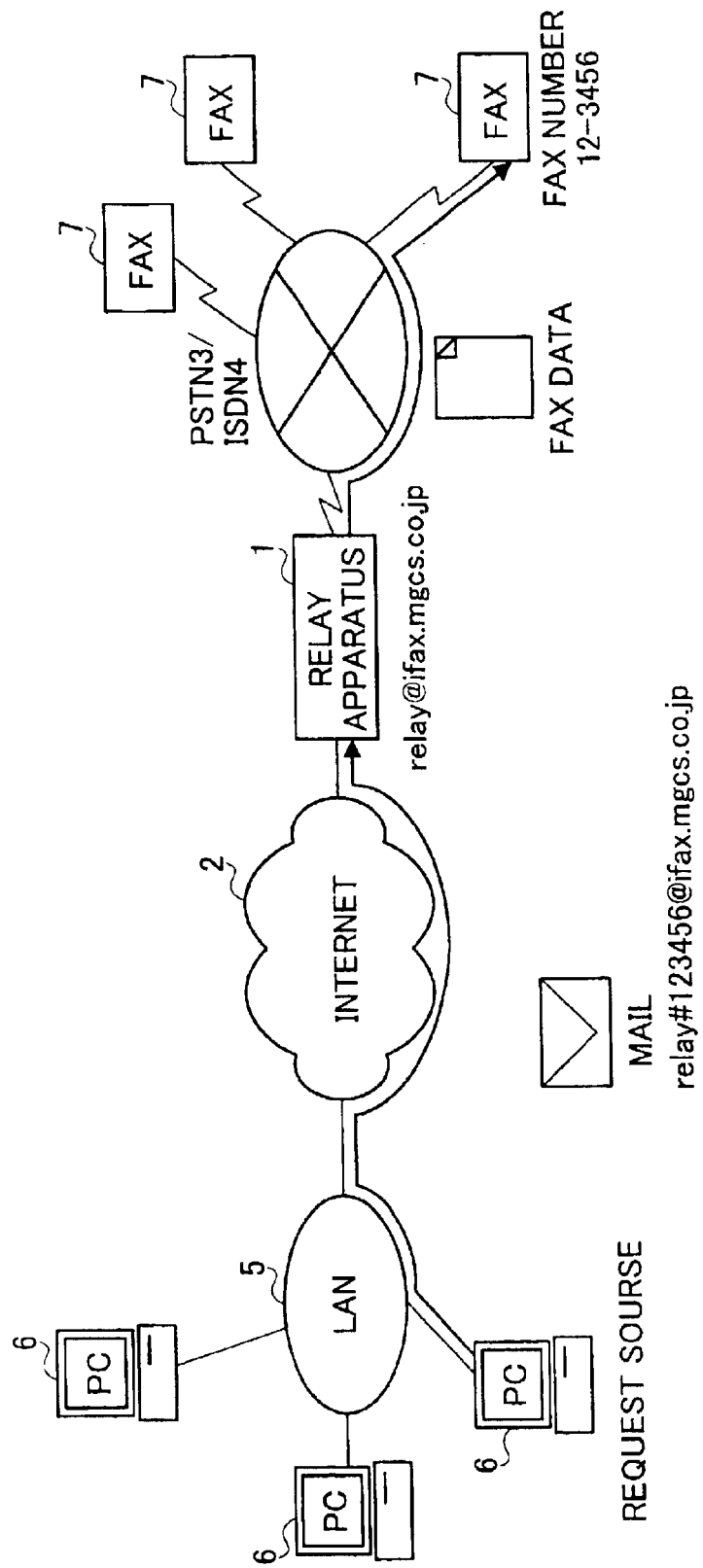
FIG. 1 is a conceptual view showing a network system where a relay apparatus according to a first embodiment of the present invention operates.

FIG. 1 is a conceptual view showing a network system where a relay apparatus according to a first embodiment of the present invention operates.

A relay apparatus 1 according to the first embodiment connects Internet 2, public switched telephone network (PSTN) 3, integrated services digital network (ISDN) 4 to one another. LAN 5 is connected to Internet 2. A plurality of PCs 6, which is the request source for relay, is connected to LAN 5.

While, a plurality of facsimile apparatuses 7 is connected to PSTN 3/ISDN 4. Facsimile apparatuses 7 are G3 facsimiles and/or G4 facsimiles.

This type of relay system transmits an e-mail message, to which image information is attached in TIFF file format, to relay apparatus 1 from PC 6 as a request source. More specifically, in such e-mail message, FAX number (for example, 12-3456) of facsimile 7 is inserted to a mail address (for example, relay@ifax.mgcs.co.jp) of Relay apparatus 1 to create a relay mail address (for example, relay#123456@ifax.mgcs.co.jp) which is used for relay request. The created relay mail address is described in a destination field (To:) of a header of the e-mail message as described in Unexamined Japanese Patent Publication No. 10-341252. This transmits the fact that this e-mail message aims at the relay request and the destination of e-mail message to Relay apparatus 1.

Relay apparatus 1 recognizes FAX number from this e-mail message. Relay apparatus 1 also converts a text portion of the e-mail message to facsimile data. Relay apparatus 1 also extracts image information from TIFF file attached to the e-mail message and converts it to facsimile data file. Thereafter, Relay apparatus 1 transmits facsimile data to the facsimile apparatus 7 with the recognized FAX number.

The e-mail message, as is widely known, is transferred to Relay apparatus 1 from PC 6 according to an e-mail transfer protocol such as SMTP, POP and so on by a mail server provided on, for example, Internet 2 or LAN 5.

Figure 2:
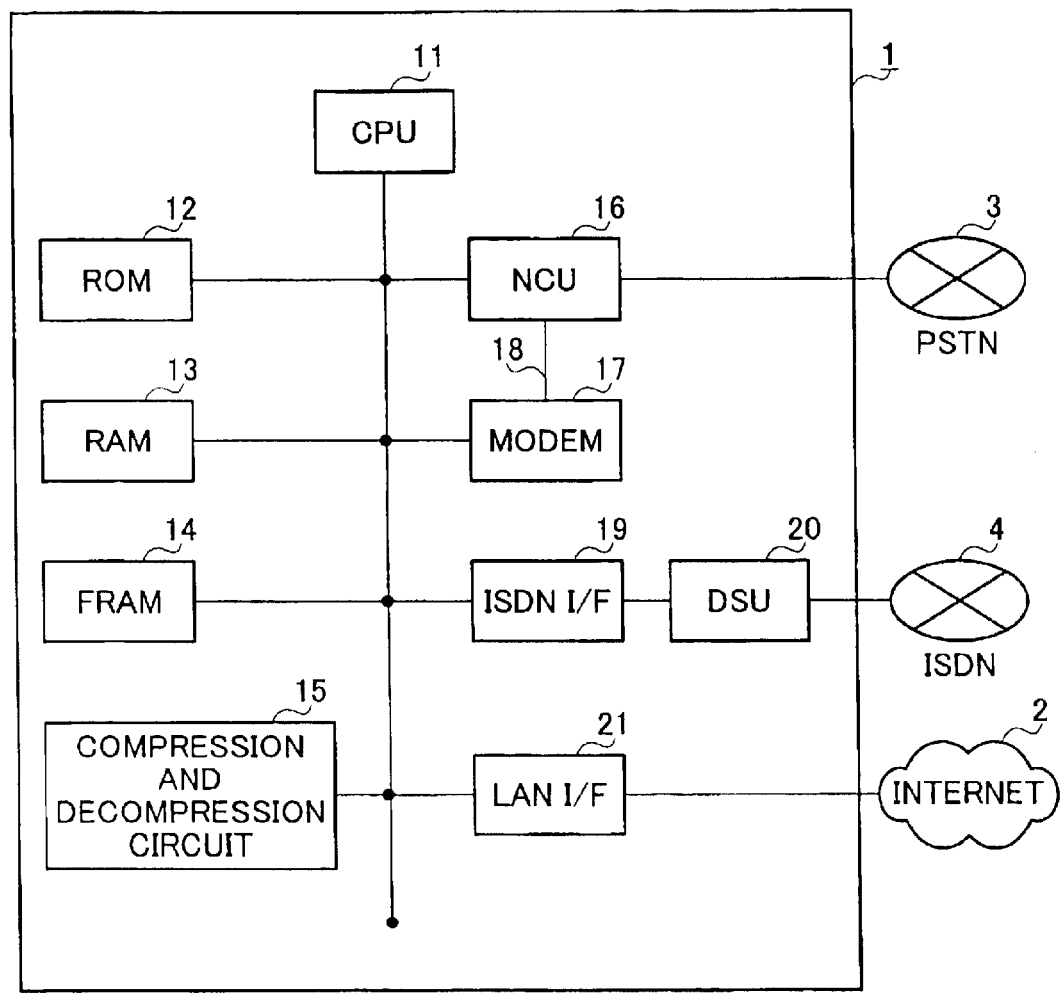
FIG. 2 is a block diagram showing hardware of the relay apparatus according to the first embodiment.

FIG. 2 is a block diagram showing hardware of the relay apparatus according to the first embodiment. CPU 11 executes a program and controls the entirety of the apparatus. ROM 12 stores the program, which is executed by CPU 11.

RAM 13 has a work area where the program is executed and a buffer area for temporarily storing various data such as e-mail, image file, and so on.

A flash memory (FRAM) 14 is a nonvolatile memory for storing facsimile data subjected to a relay request. A secondary storage device such as a hard disk drive may be used in place this flash memory 14.

Compression and decompression circuit 15 compresses transmitting image information to facsimile data such as MH, MR, MMR and the like and decompresses received facsimile data to image data.

Network control unit (NCU) 16 is connected to PSTN 3. Modem 17 is connected to NCU 16 by analog signal line 18. Modem 17 modulates/demodulates facsimile data to be transmitted/received to/from modem 17 and the facsimile apparatus of the communication partner via PSTN 3. In addition, ISDN interface (I/F) 19 is connected to ISDN 4 via digital service unit (DSU) 20.

LAN interface 21 is connected to Internet 2 via a router (not shown) and executes a necessary procedure for transmitting and receiving data via Internet 2.

Figure 3:
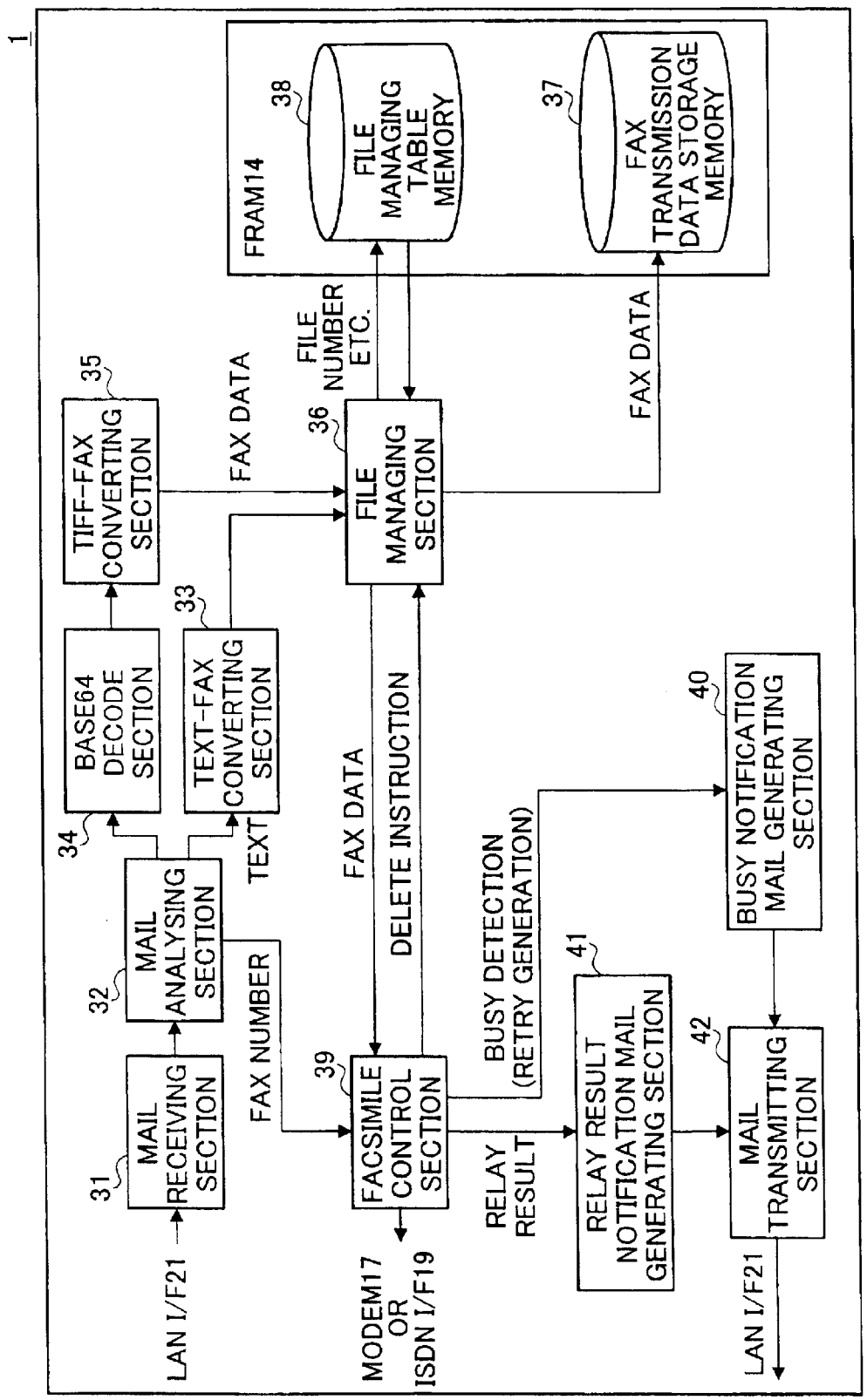
FIG. 3 is a function block diagram showing the functions of the relay apparatus according to the first embodiment.

FIG. 3 is a function block diagram showing the functions of the relay apparatus according to the first embodiment. Though the functions set forth below can be implemented by the program, which is executed by CPU 11, at least a part of the functions may be implemented by the other devices such as DSP, LSI and the like.

Mail receiving section 31 receives e-mail via LAN interface 21 using a mail transfer protocol such as SMTP, POP 3, and the like.

Mail analyzing section 32 analyzes an e-mail message received by mail receiving section 31. Mail analyzing section 32 analyzes the structure of the e-mail message to check whether or not a text part is contained in the e-mail mail message and whether or not an attached file part is contained therein. In addition, when the attached file part is contained therein, analyzing section 32 checks whether the attached file is TIFF-FX file format or not.

In a case where an e-mail message is a multipart mail, which is based on MIME (Multipurpose Internet Mail Extension), the e-mail message is broadly divided into a header and a body. The body is divided into a plurality of parts by boundaries defined by the header. A sub-header is described at the first part of each part to show the content of each part. The analyzing section 32 determines the presence or absence of the text part, the presence or absence of the attached file, and the type of the attached file to identify.

The TIFF-FX file format is a standard data format for Internet facsimile, and is defined by RFC 2301 of IETF (Internet Engineering Task Force). More specifically, TIFF-FX supports color and monochrome. More specifically, TIFF-FX supports MH, MR, MMR, JBIG in monochrome and JPEG in color based on an encoding system.

TEXT-FAX converting section 33 converts character code information of text part to image data, and further converted to facsimile data.

Base64 decode section 34 decodes the text code of attached filed part according to Base64 to obtain a TIFF-FX file. TEXT-FAX converting section 35 removes TIFF header and IFD from TIFF-FX file and converts it to facsimile data where a plurality of image compressed data is continued. In addition, the coding system for converting binary data to text data is not limited to Base64.

File managing section 36 adds a file number to facsimile data and stores the resultant to FAX transmission data storage memory 37 of FRAM 14. File managing section 36 also registers the file number and the like to a file manage table stored in file manage table memory 38, and manages the resultant. File managing section 36 may adds a file name in place of the file number to the facsimile data.

Facsimile control section 39 transmits facsimile data to the FAX number recognized by mail analyzing section 32. Facsimile control section 39 also detects a busy signal, which is originated by the facsimile apparatus 7 at the recipient side, and executes a retry operation, while notifies busy notification mail generating section 40 of the detection result.

Moreover, facsimile control section 39 notifies relay result notification mail generating section 41 of the relay result (success or failure) when the relay operation is completed. In the case of the success of relay, facsimile control section 39 instructs facsimile managing section 36 to delete the relayed facsimile data stored in FAX transmission data storage memory 37.

When facsimile control section 39 detects a busy signal, busy notification mail generating section 40 generates a busy notification mail message and instructs the mail transmitting section 42 to transmit the generated busy notification mail message. The content of busy notification mail message is one that informs PC 6 as a request source of the fact that the destination facsimile apparatus 7 is busy.

Moreover, relay result notification mail generating section 41 generates a relay result notification mail message according to the relay result from facsimile control section 39 and instructs the mail transmitting section 42 to transmit the generated relay result notification mail message.

Figure 4:
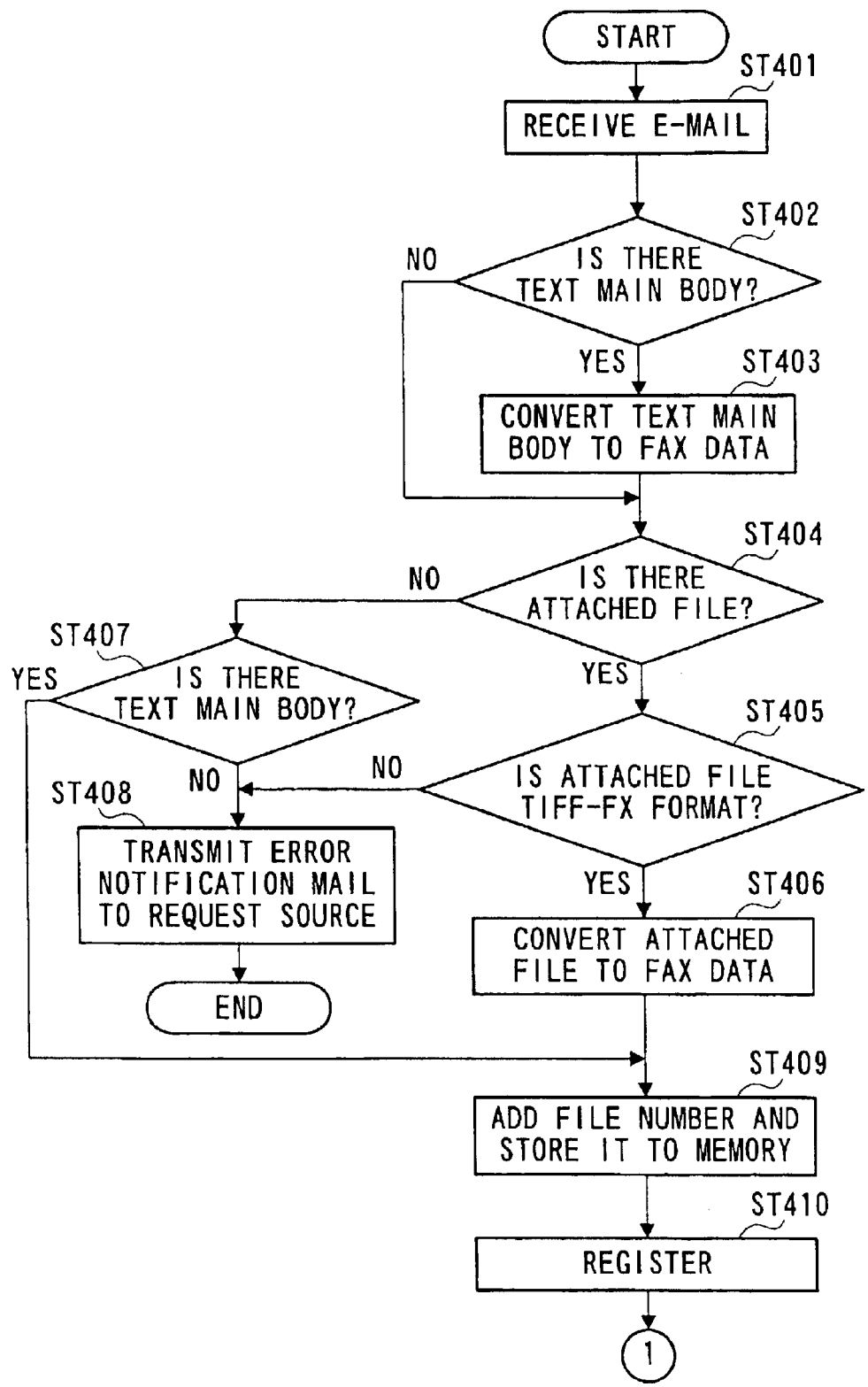
FIG. 4 is a flowchart showing a relay operation in the relay apparatus according to the first embodiment.
Figure 5:
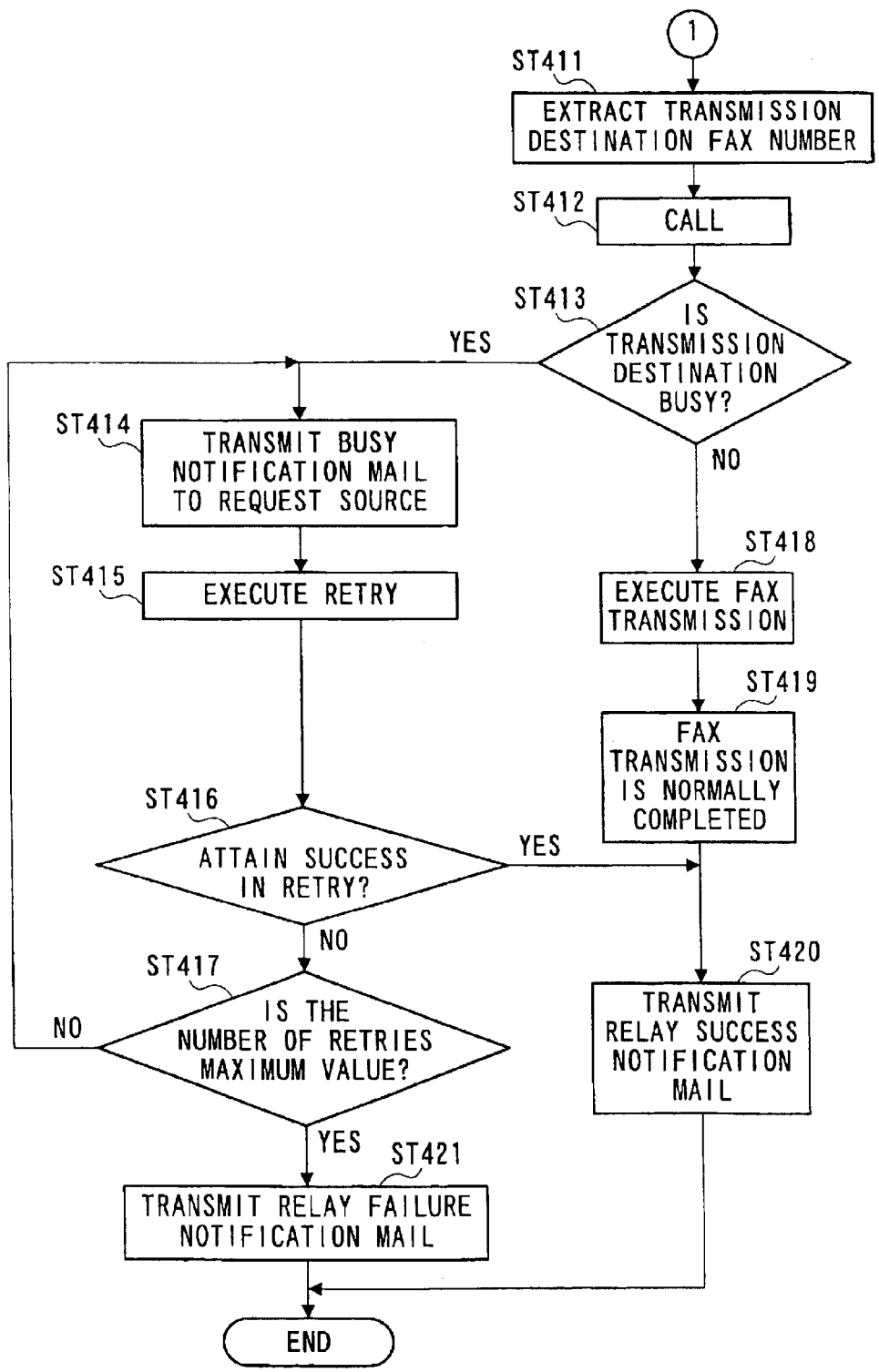
FIG. 5 is a flowchart showing a relay operation in the relay apparatus according to the first embodiment.

A relay operation due to relay apparatus 1 will be next explained. FIGS. 4 and 5 are flowcharts each showing a relay operation in the relay apparatus according to the first embodiment.

Mail receiving section 31 of relay apparatus 1 receives e-mail from Internet 2 via LAN interface 21 (ST401). Mail analyzing section 32 analyzes the received e-mail. First, mail analyzing section 32 determines as to whether or not there is a main body of a text in the received e-mail (ST402). When there is a main body, TEXT-FAX converting section 33 converts the main body of text to FAX data (ST403). When there is no main body, the operation goes to ST404.

Mail analyzing section 32 determines as to whether or not there is an attached file in the received e-mail (ST404). When there is an attached file, mail analyzing section 32 determines as to whether or not the attached file is TIFF-FX format (ST405). When the attached file is TIFF-FX format, base64 decode section 34 converts the attached file part to TIFF file data, and TEXT-FAX converting section 33 converts TIFF file data to FAX data (ST406).

When there is no attached file in ST404, mail analyzing section 32 confirms as to whether or not there is the main body of text in ST402 (ST407). When there is no main body, mail analyzing section 32 instructs mail transmitting section 42 to transmit an error notification mail to the request source (ST408). The same can be applied to a case in which the attached file is not TIFF-FX format in ST405.

File managing section 36 adds a file number to facsimile data, which is obtained by converting the main body of text or the attached file, and stores the resultant to FAX transmission data storage memory 37 (ST409). File managing section 36 also registers the file number to file manage table memory 38 (ST410).

Sequentially, mail analyzing section 32 extracts a transmission destination FAX number from the received e-mail and sends it to facsimile control section 39 (ST411). Facsimile control section 39 controls modem 17 or ISDN interface 19 to call out the transmission destination FAX number received from mail analyzing section 32 (ST412).

Facsimile control section 39 detects as to whether or not the transmission destination is busy (ST413). When facsimile control section 39 detects a busy state, facsimile control section 39 notifies busy notification mail generating section 40 of the detection of the busy state. In accordance with this notification, notification mail generating section 40 generates a busy notification mail as shown in FIG. 6, and instructs mail transmitting section 42 to transmit the busy notification mail (ST414). Facsimile control section 39 performs a retry of facsimile transmission to facsimile apparatus 7 of the transmission destination (ST415). Facsimile control section 39 determines whether or not success in retries is attained (ST416). When the retry results in failure, facsimile control section 39 determines whether or not the number of retries achieves a maximum value (ST417). When the number of retries does not achieve the maximum value, the operation goes back to ST414, and transmission of busy notification mail (ST414) and the retry (ST415) are repeated.

In ST413, when the facsimile apparatus of transmission destination calls in, facsimile control section 39 transmits FAX data subjected to the relay request to the facsimile apparatus 7 of transmission destination (ST418). After FAX transmission is normally completed (ST419), facsimile control section 39 notifies relay result notification mail generating section 41 of success in relay. In accordance with this notification, relay result notification mail generating section 41 generates a relay success notification mail as shown in FIG. 7, and instructs mail transmitting section 42 to transmit the relay success notification mail (ST420). Even when success in retries is attained in ST416, the relay success notification mail is transmitted similarly.

When FAX transmission cannot be normally completed even if the retry operation is repeated up to the maximum number of times (ST417), facsimile control section 39 notifies relay result notification mail generating section 41 of failure in relay. In accordance with this notification, relay result notification mail generating section 41 generates a relay failure notification mail and instructs mail transmitting section 42 to transmit the relay failure notification mail (ST421).

As shown in FIG. 1, relay apparatus 1 can receive the request for relay from a plurality of PCs 6. Therefore, at the time of transmitting the busy notification mail in ST414 shown in FIG. 5 to a request source, it is necessary to specify the request source to which the busy notification mail should be transmitted. For this reason, according to the first embodiment, mail analyzing section 32 extracts a mail address of a request source from the e-mail received in ST401, and pairs the extracted mail address with a file number of transmitting FAX data, and stores the resultant to file manage table memory 38.

According to relay apparatus 1 of the first embodiment described above, if the transmission destination is busy when relay apparatus 1 calls out the facsimile apparatus 7 of the transmission destination, the e-mail message, which indicates the fact that the transmission destination is busy, is sent to the request source. Thereafter, facsimile transmission to the transmission destination is retried. In other words, at the time of performing the retry of the relay to the transmission destination, relay apparatus 1 notifies the request source of the fact that relay apparatus 1 is retrying by use of e-mail. Accordingly, it possible for the request source, which requests relay apparatus 1 to relay, to recognize that relay apparatus 1 is retrying the relay operation.

It is extremely difficult to check the operation state of relay apparatus 1 directly in the case where PC 6 as a request source requests relay apparatus 1 to relay over Internet 2, in other word, PC 6 requests relay apparatus 1, which is located at a remote site or overseas, to relay, as shown FIG. 1. Therefore, the effect of this embodiment is brought to the fore in this case.

Furthermore, according to the first embodiment described above, relay apparatus 1 is designed to receive the request for relay from the plurality of request sources. However, the mail addresses of request sources and facsimile numbers of transmitting FAX data are managed, thereby making it possible to transmit the busy notification mail after specifying the request resource correctly.

(Second Embodiment)

Figure 8:
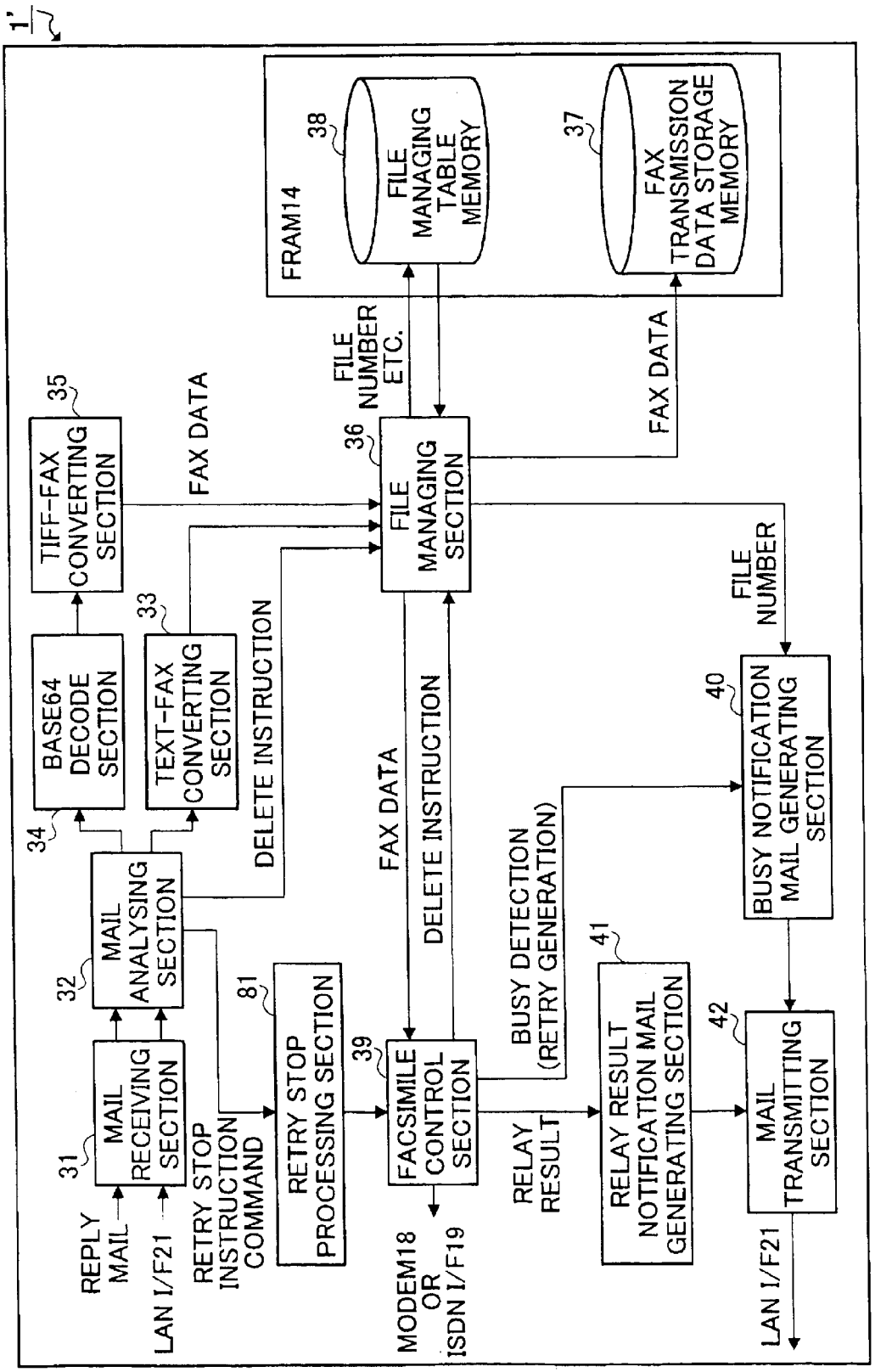
FIG. 8 is a function block diagram showing the functions of a relay apparatus according to a second embodiment.

The following will explain the relay apparatus according to a second embodiment of the present invention. FIG. 8 is a function block diagram showing the functions of the relay apparatus according to the second embodiment. The same numerical symbols as those of the first embodiment are added to the same configuration as that of the first embodiment, and the explanation is omitted.

According relay apparatus 1' of the second embodiment shown FIG. 8, the request source sends a mail replying to a busy notification mail, thereby making it possible to stop the retry of relay due to relay apparatus 1'.

In other words, mail analyzing section 32 identifies whether or not the e-mail received by mail receiving section 31 is a mail replying to a busy notification mail. Judgment on whether the e-mail is the reply mail or not is carried out by whether or not a subject of busy notification mail is included in a subject field <Subject:> of e-mail. More specifically, busy notification mail generating section 40 sets the subject of busy notification mail to "FAX BUSY." Then, in a case where the subject of e-mail is "Re: FAX BUSY" or includes "FAX BUSY", the mail analyzing section 32 judges that the e-mail is the replay mail.

Moreover, the mail analyzing section 32 identifies to which relay the reply mail is related. More specifically, busy notification mail generating section 40 obtains a file number of FAX data, which is requested to be relayed by file managing section 36, and inserts the file number into the subject of busy notification mail as in, for example, "FAX BUSY (file No. 138)." Mail analyzing section 32 extracts the file number included in the subject of reply mail, and recognizes it.

Retry stop processing section 81 subjects facsimile control section 39 to an interrupt in order to stop the retry operation when mail analyzing section 32 identifies the reply mail.

Figure 9:
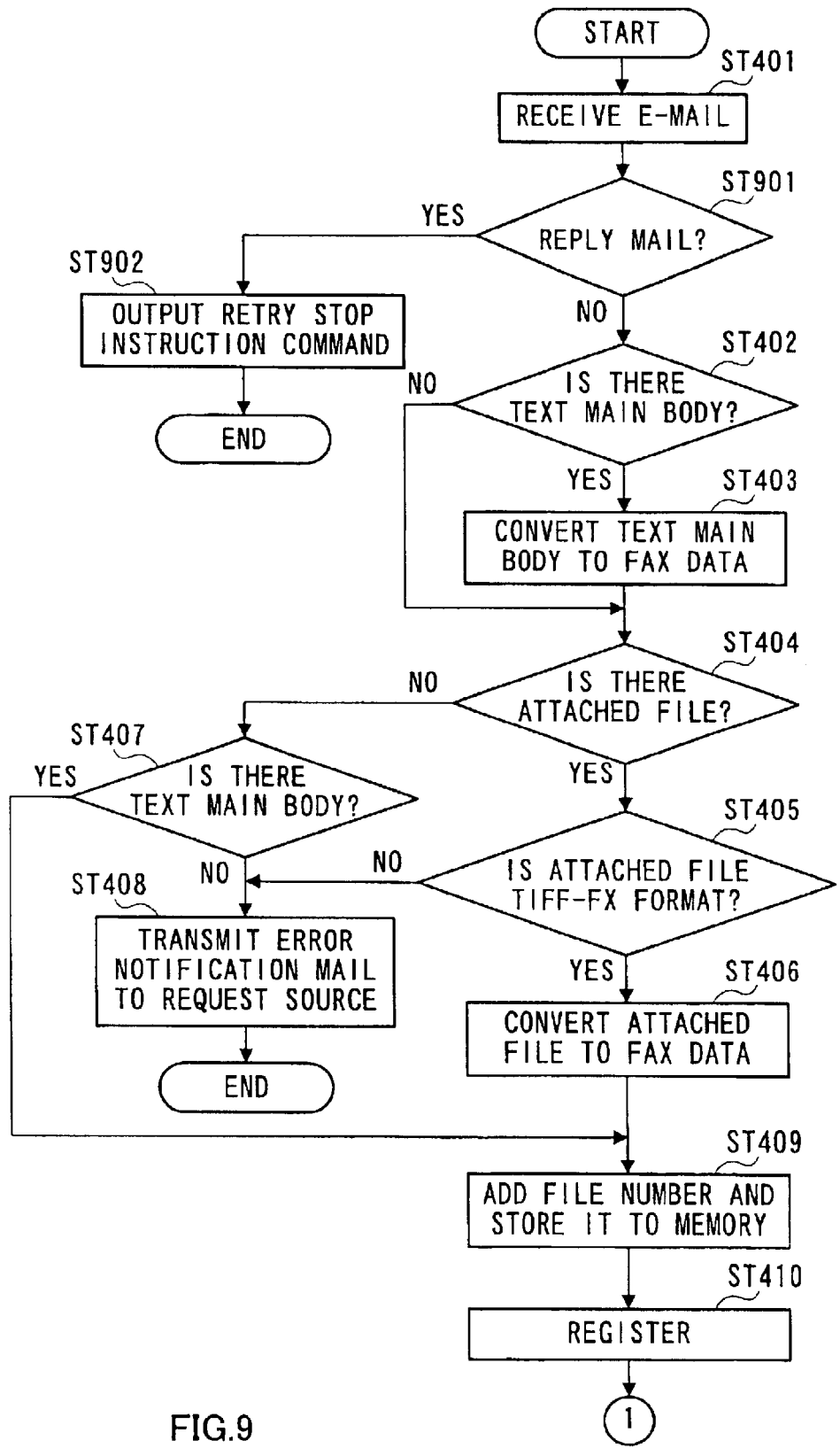
FIG. 9 is a flowchart showing a relay operation in the relay apparatus according to the second embodiment.
Figure 10:
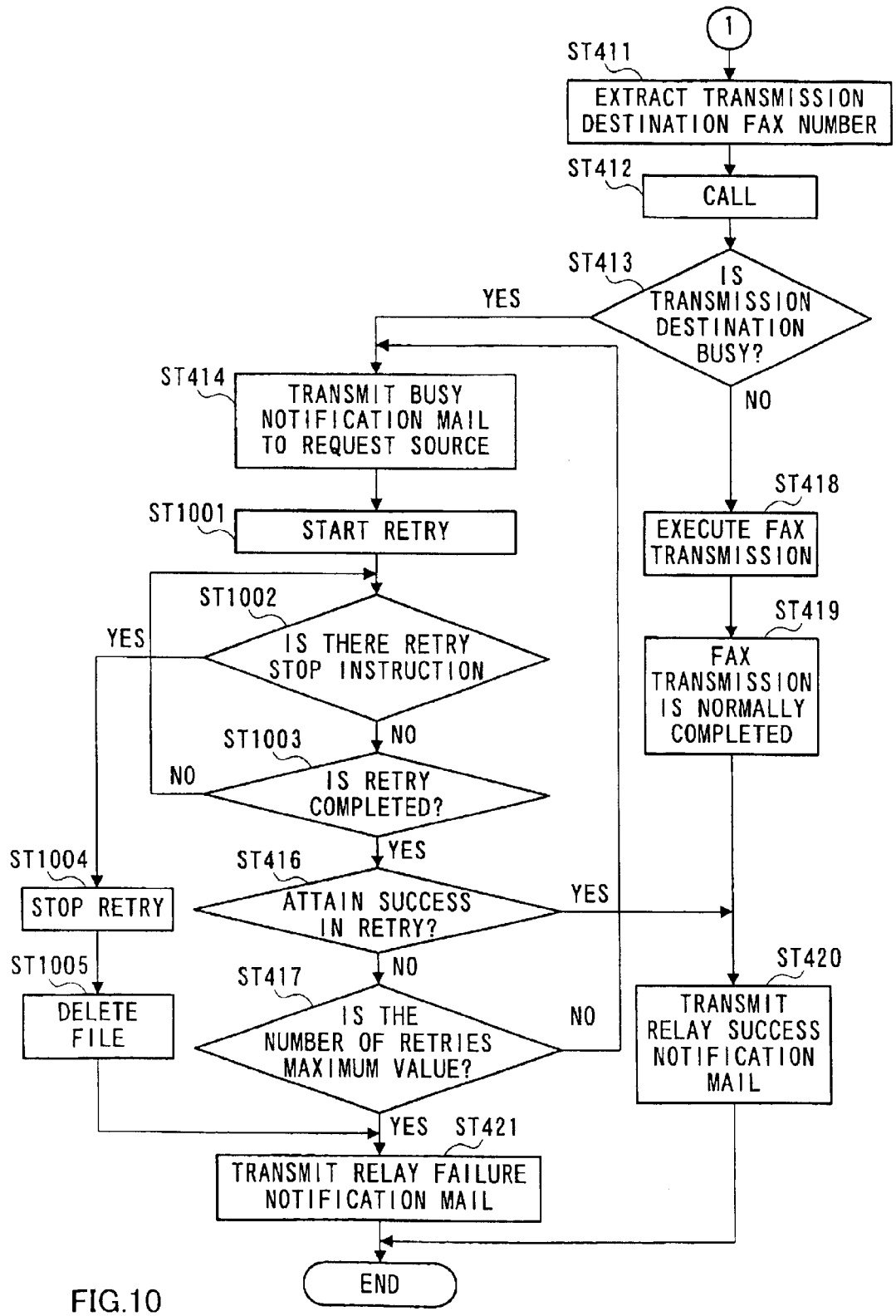
FIG. 10 is a flowchart showing a relay operation in the relay apparatus according to the second embodiment.

Next, a relay operation due to relay apparatus 1' is explained. FIGS. 9 and 10 are flowcharts each showing a relay operation in relay apparatus 1' according to the second embodiment. The same numerical symbols as those of the first embodiment are added to the same steps as those of the first embodiment, and the explanation is omitted.

In the second embodiment, as shown in FIG. 10, after sending the busy notification mail to the request source (ST414), facsimile control section 39 starts the retry operation (ST1001). Thereafter, facsimile control section 39 determines as to whether or not there is an instruction to stop the retry from retry stop processing section 81 (ST1002). Where there is no instruction to stop the retry, facsimile control section 39 determines as to whether or not the retry is completed (ST1003). When the retry is not completed, the operation goes back to ST1002 and operations in ST1002 and ST1003 are repeated.

Where there is an instruction to stop the retry operation from retry stop processing section 81 in ST1002, facsimile control section 39 controls modem 17 or ISDN interface 19 to stop the retry (ST1004). Next, facsimile control section 39 instructs file managing section 36 to delete FAX data from FAX transmission storage memory 37 (ST1005). Thereafter, facsimile control section 39 notifies relay result notification mail generating section 41 of failure of relay in ST421. In accordance with this notification, relay result notification mail generating section 41 generates a relay failure notification mail, and instructs mail transmitting section 42 to transmit the generated mail (ST421).

When the retry is completed in ST1003, processing in ST416, ST417, and ST420 is carried out.

As described above, in relay apparatus 1' according to the second embodiment, the retry operation is subjected to an interrupt in ST1002. In addition, as shown in FIG. 9, after mail receiving section 31 receives e-mail (ST401), mail analyzing section 32 determines as to whether or not e-mail is a mail replying to the busy notification mail (hereinafter simply referred to as reply mail). If e-mail is not the reply mail to the busy notification mail, processing goes to the relay operations in ST402 and afterwards similar to the first embodiment. If e-mail is the reply mail to the busy notification mail, mail analyzing section 32 notifies retry stop processing section 81 of this fact. In response to this notification, retry stop processing section 81 instructs facsimile control section 39 to stop the retry (ST902). Whereby, the retries in ST1001 to ST1003 are subjected to an interrupt, with the result that the retry operation can be stopped.

According to relay apparatus 1' of the second embodiment described above, since the busy notification mail is sent to the request source, it is possible to recognize that relay apparatus 1' is retrying the relay operation.

Moreover, according to the second embodiment, the reply mail to the busy notification mail is sent from the request source, relay apparatus 1' identifies the reply mail, stops the retry operation, and further deletes FAX data. This makes it possible for the request source to stop the retry operation of relay apparatus 1' and to delete FAX data. Namely, it is possible to cancel the relay, which relay apparatus 1' is requested to carry out by the request source. For example, there is a case in which transmission destination is a telephone since the transmission destination facsimile number is wrong. In this case, according to relay apparatus 1' of the second embodiment, since it is possible to stop the retry by the reply mail from the request source, thereby avoiding the inconvenience in which erroneous calling out is unnecessarily repeated.

In the second embodiment, Internet 2 is provided between the request source and relay apparatus 1'. However, there is an advantage in which the PC operator does not have to move to the relay apparatus to stop the retry in not only a case in which the relay apparatus is provided at the remote site but also a case in which a plurality of terminals shares the relay apparatus on the same premises.

Furthermore, in the second embodiment, since the retry of relay apparatus 1' can be stopped only by sending the reply mail by the request source, PC user as the request source can control relay apparatus 1' easily.

Though the request source is PC in the second embodiment, it is possible to use terminal apparatuses having e-mail functions such as Internet facsimile apparatus, network scanner, multi-function machine, copy machine, and the like. In some cases, such terminal apparatuses other than PC are poor in a user interface since there is no full keyboard and display or they are insufficient. Even in such a case, it is possible to stop the retry of relay apparatus 1' extremely easily by providing means for transmitting the reply mail automatically when receiving the busy notification mail from relay apparatus 1'. However, the present invention includes a technique of instructing the relay apparatus placed at the remote site over Internet to stop the retry by use of not the reply mail but general e-mail, as well as the technique of instructing the relay apparatus to stop the retry by use of the reply mail.

(Third Embodiment)

Figure 11:
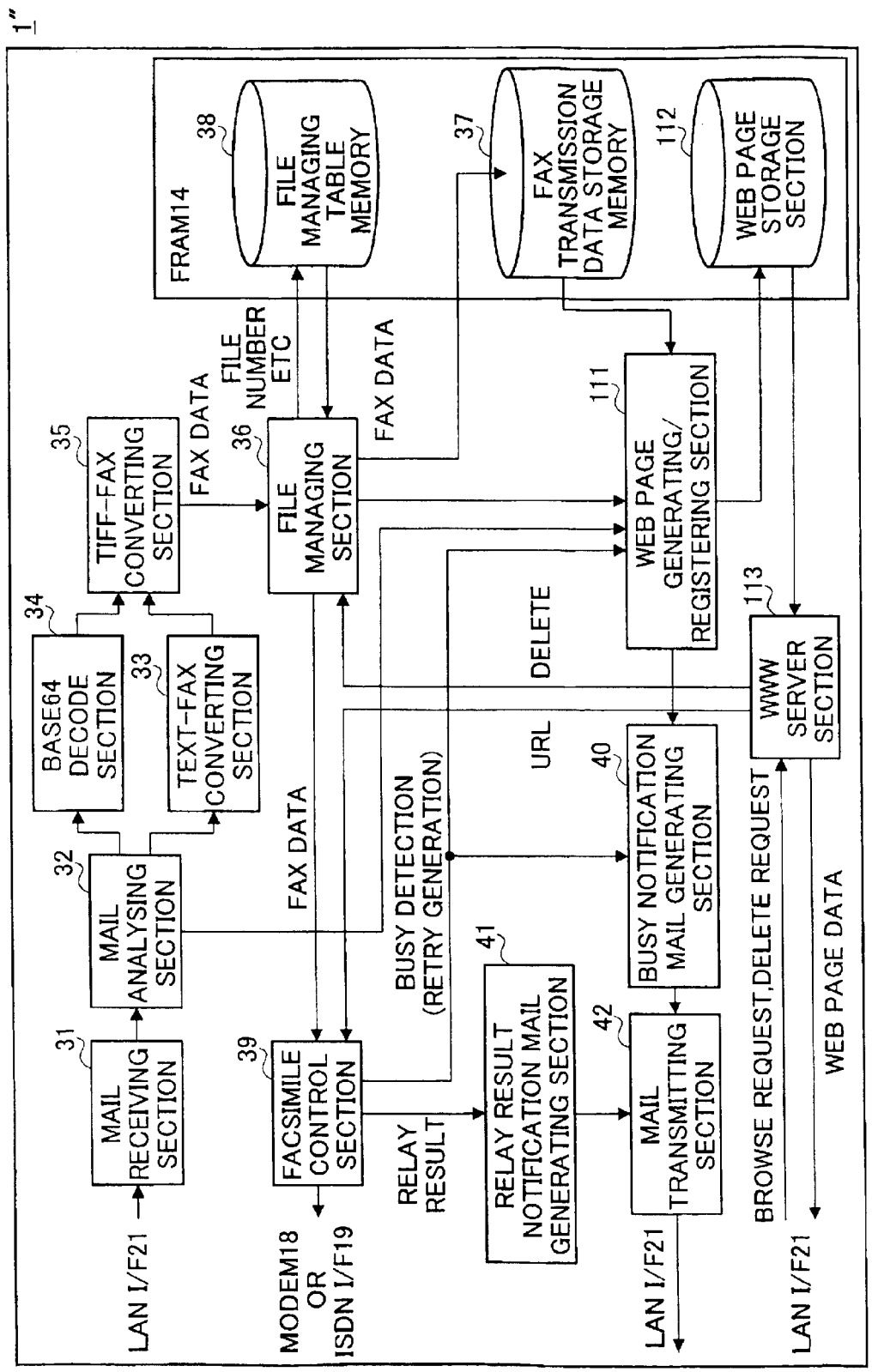
FIG. 11 is a function block diagram showing the functions of a relay apparatus according to a third embodiment.

An explanation is given of the relay apparatus according to the third embodiment of the present invention. FIG. 11 is a function block diagram showing the functions of the relay apparatus according to the third embodiment. The same numerical symbols as those of the first and second embodiments are added to the same configuration as those of the first and second embodiments, and the explanation is omitted.

In relay apparatus 1" according to the third embodiment, Web page generating/registering section 111 generates a Web page when receiving notification in which the transmission destination is busy from facsimile control section 39. This Web page 121 includes subject 122 of FAX data in retry, FAX number 123 of transmission destination, thumb nail image 124 in which an image on a first page of FAX data is reduced, and the like. Web page 121 also has a delete button 125 for instructing the stop of retry and the delete of FAX data, and a cancel button 126 for closing Web page 121.

Web page generating/registering section 111 generates Web page 121 for each request source.

Web page generating/registering section 111 stores HTML file (hereinafter referred to as Web page data) in which Web page 121 is described to Web page storage section 112, and sends URL of Web page data to busy notification mail generating section 40.

WWW server section 113 makes Web page 121 public on Internet 2, and transfers Web page data to PC 6 in repose to a browsing request from PC 6 as a request source in accordance with HTTP (Hypertext Transfer Protocol). WWW server section 113 also instructs retry stop processing section 81 to stop the retry and instructs file managing section 36 to delete FAX data in accordance with the delete request transmitted from PC 6 through Web page 121, which is opened on PC 6 by the browser. This operation can be implemented by a general WWW technique such as CGI (Common Gateway Interface), JavaScript and so on.

Figure 13:
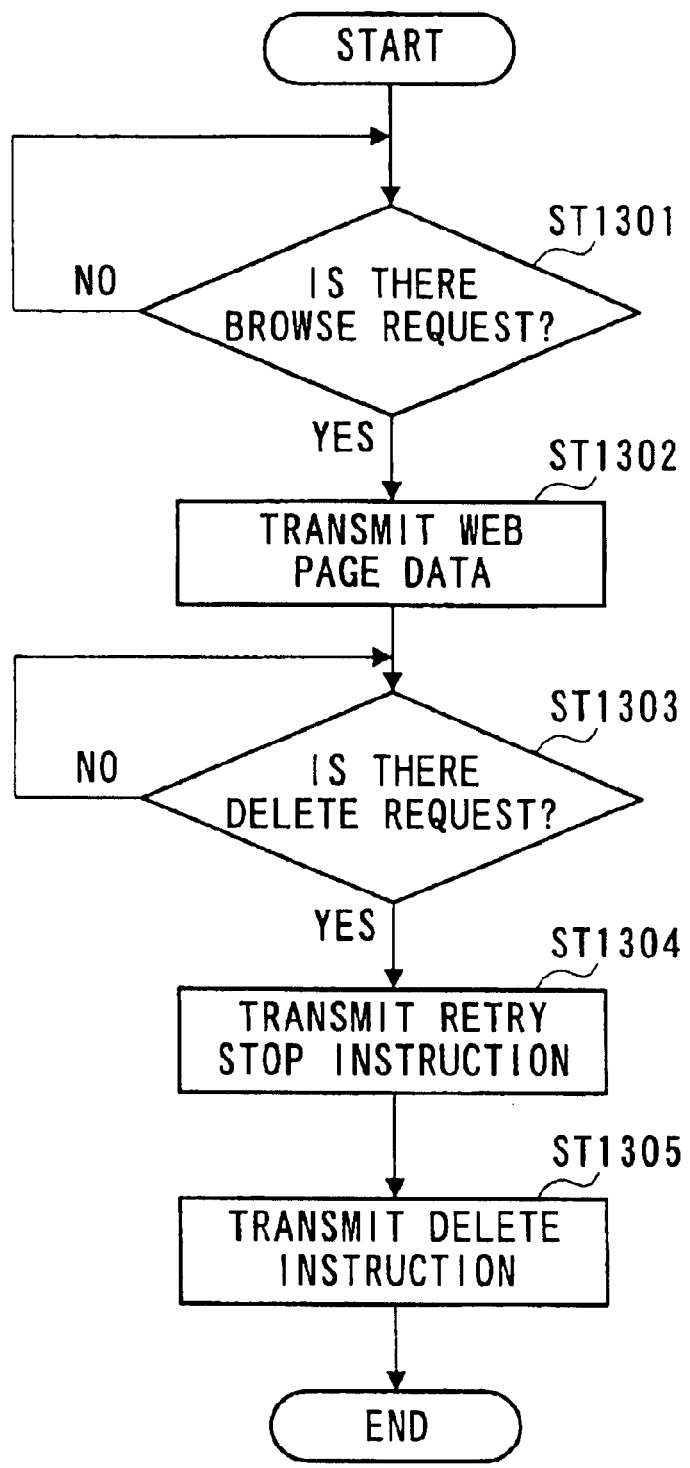
FIG. 13 is a flowchart showing the operation of a WWW server section in the relay apparatus according to the third embodiment.

An operation of the WWW server section in relay apparatus 1" will be next described. FIG. 13 is a flowchart showing the operation of the WWW server section in relay apparatus 1" according to the third embodiment.

WWW server section 113 waits for a browsing request from the browser, which operates on PC 6 and the like (ST1301). When there is a browsing request from the browser, WWW server section 113 transmits Web page data to the browser (ST1302). Thereafter, WWW server section 113 waits for a delete request form the browser (ST1303). When a delete request is detected, WWW server section 113 transmits an instruction to stop the retry to facsimile control section 39 (ST1304). Sequentially, WWW server section 113 transmits an instruction of delete to file managing section 36 (ST1305).

Figure 14:
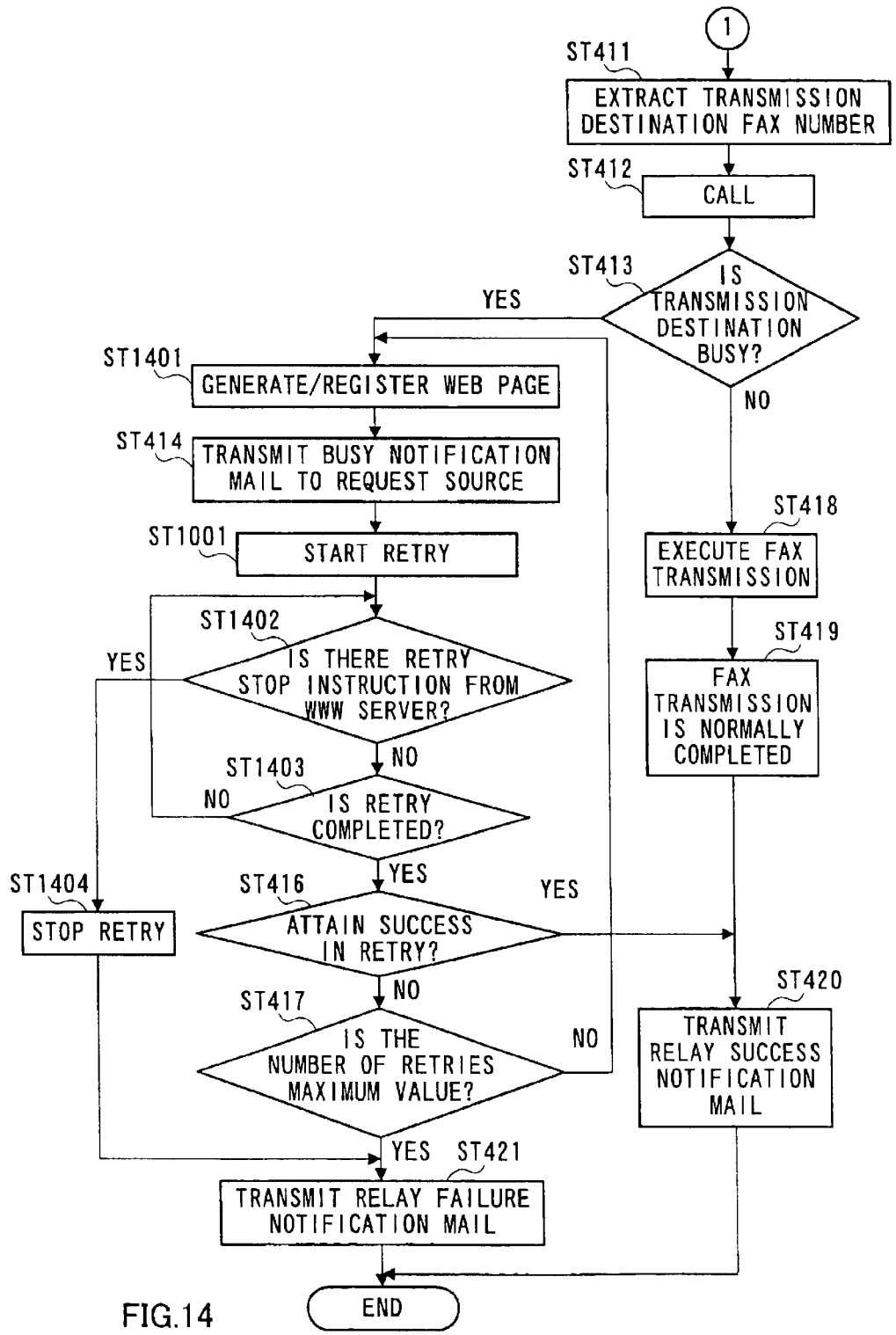
FIG. 14 is a flowchart showing a relay operation in the relay apparatus according to the third embodiment.

A relay operation in relay apparatus 1" will be next described. FIG. 14 is a flowchart showing the relay operation in relay apparatus 1" according to the third embodiment. The same numerical symbols as those of the first and second embodiments are added to the same steps as those of the first and second embodiments, and the explanation is omitted.

Relay apparatus 1" performs the same operation as the flow shown in FIG. 4 in ST401 through ST410.

In relay apparatus 1" according to the third embodiment, when facsimile control section 39 judges that the transmission destination is busy (ST413), busy notification mail generating section 40 and Web page generating/registering section 111 are notified of this judgment. Web page generating/registering section 111 generates Web page 121 in accordance with this notification and registers it (ST1401). Web page generating/registering section ll also sends URL of Web page 121 to busy notification mail generating section 40. Here, since Web page generating/registering section 111 generates Web page 121 for each request source, URLs are different from the request source to another. Busy notification mail generating section 40 generates a busy notification mail, which notifies that the transmission destination is busy (ST414). Busy notification mail generating section 40 also describes URL of Web page 121 in the busy notification mail.

Thereafter, facsimile control section 39 starts a retry operation (ST1001). Facsimile control section 39 determines as to whether or not there is an instruction to stop the retry from WWW server section 113 during the retry operation (ST1402). When there is no instruction to stop the retry, facsimile control section 39 determines whether or not the retry is completed (ST1403). When the retry is not completed, the operation goes to ST1402, and operations in ST1402 and ST1403 are repeated.

When there is an instruction to stop the retry, facsimile control section 39 controls modem 17 or ISDN interface 19 to stop the retry (ST1004). Thereafter, in ST421, facsimile control section 39 notifies relay result notification mail generating section 41 of failure of relay. In accordance with this notification, relay result notification mail generating section 41 generates a relay failure notification mail, and instructs mail transmitting section 42 to transmit the generated mail (ST421).

When the retry is completed in ST1403, the same processing as that of ST416, ST417 and ST420 is carried out similar to the first embodiment.

According to relay apparatus 1" of the third embodiment described above, since the busy notification mail is sent to the request source, it is possible to recognize that relay apparatus 1" is retrying to the relay operation, similar to the first embodiment.

Moreover, according to the third embodiment, when the retry occurs, Web page 121, which shows that the requested relay is retrying, is generated and made public. For this reason, it is possible to recognize that relay apparatus 1" is retrying by browsing Web page 121 from the terminal of PC 6 as a request source and the like.

Furthermore, Web page 121 includes information relating to the content of relay request such as subject 122, transmission destination 123, thumb nail image 124 of the first page image of FAX data. For this reason, the content of FAX data in retry can be easily confirmed by browsing this Web page 121 at the request source.

Web page 121 also includes delete button 125 for requesting relay apparatus 1" to stop the retry and to delete FAX data. For this reason, when the request source wishes to stop the retry, the delete request is transmitted to relay apparatus 1" by clicking delete button 125. This makes it possible to cause relay apparatus 1" to stop the retry and to delete FAX data from FAX transmission data storage memory 37. In this way, according to the third embodiment, the request source can control relay apparatus 1" from the browser, which operates on the terminal such as PC 6 and the like, over Internet 2 or LAN 5. As a result, similar to the second embodiment, it is possible to avoid the inconvenience in which the erroneous calling is unnecessarily repeated when the FAX number is incorrect.

Since Web page generating/registering section 111 generates Web page 121 for each request source, information on facsimile data, which carries out the retry operation, is provided in Web page 121 for each request source. For this reason, the request source can grasp the retry occurring sate easily. However, Web page 121 does not always have to generate for each request source.

Additionally, according to the third embodiment, relay apparatus 1" is designed to describe URL of Web page 121 in the busy notification mail. The request source can recognize URL of Web page 121 by receiving busy notification mail. This makes it possible to gain access to Web page 121 speedily and easily. Particularly, as mentioned above, Web page generating/registering section 111 generates Web page 121 for each request source, and these URLs are different from the request source to another. In such a case, if URL is described in the busy notification mail, the request source can gain access to its own Web page 121 easily among from many Web pages 121.

However, in the present invention, the relay apparatus does not always have to notify the request source of URL by use of e-mail. In a case where the request source recognizes URL in advance or searches it on WWW, the request source can gain access to Web page 121 voluntarily to inspect the relay operation state of relay apparatus 1" (whether or not the retry is executing).

(Fourth Embodiment)

An explanation is given of the relay apparatus according to the fourth embodiment of the present invention. The relay apparatus of the fourth embodiment is composed of the same configuration as that of the third embodiment. The following explanation is made using the same numerical symbols as those of FIG. 11.

Figure 12:
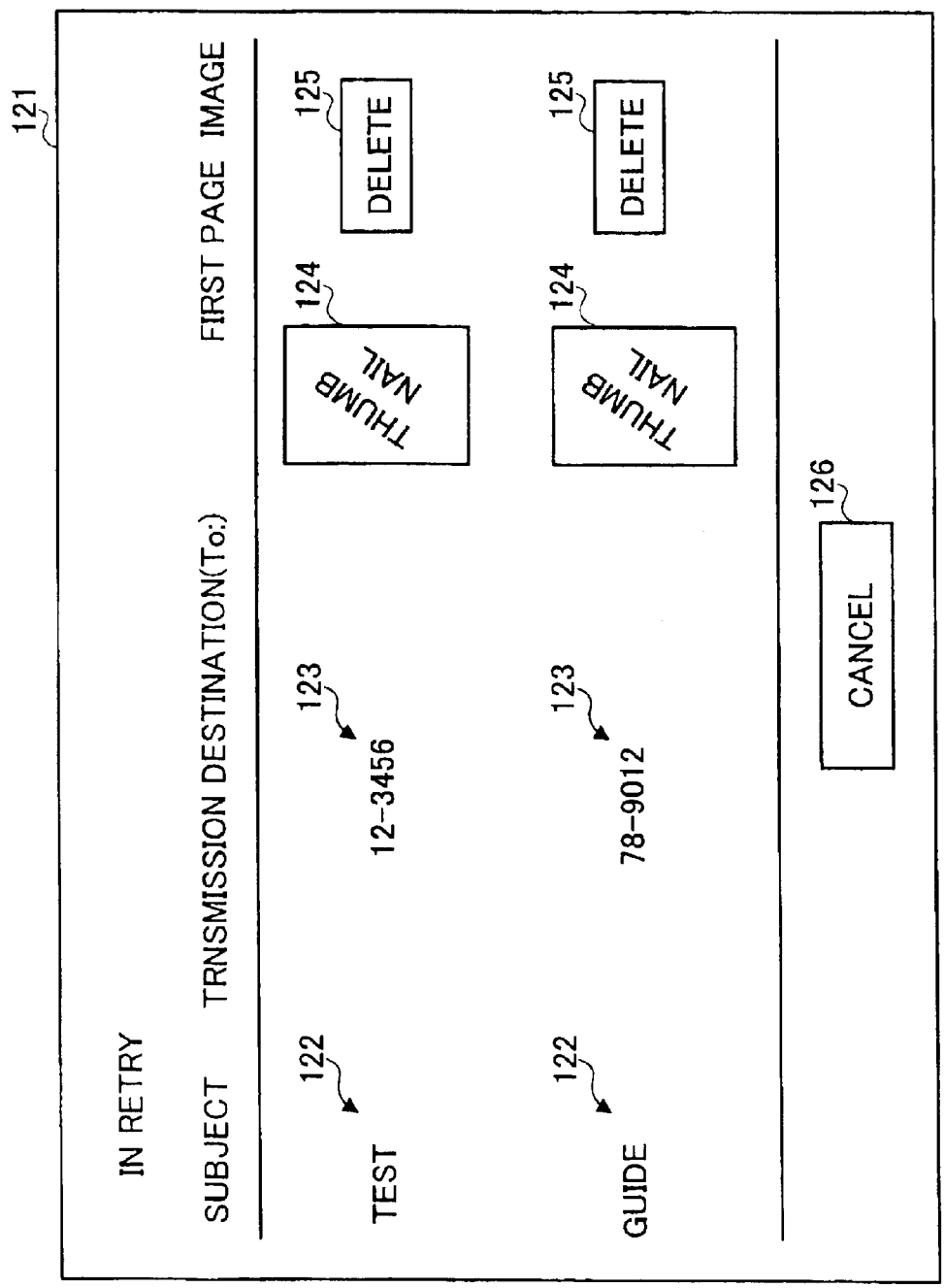
FIG. 12 is a view showing one example of a Web page of the relay apparatus according to a third embodiment.
Figure 15:
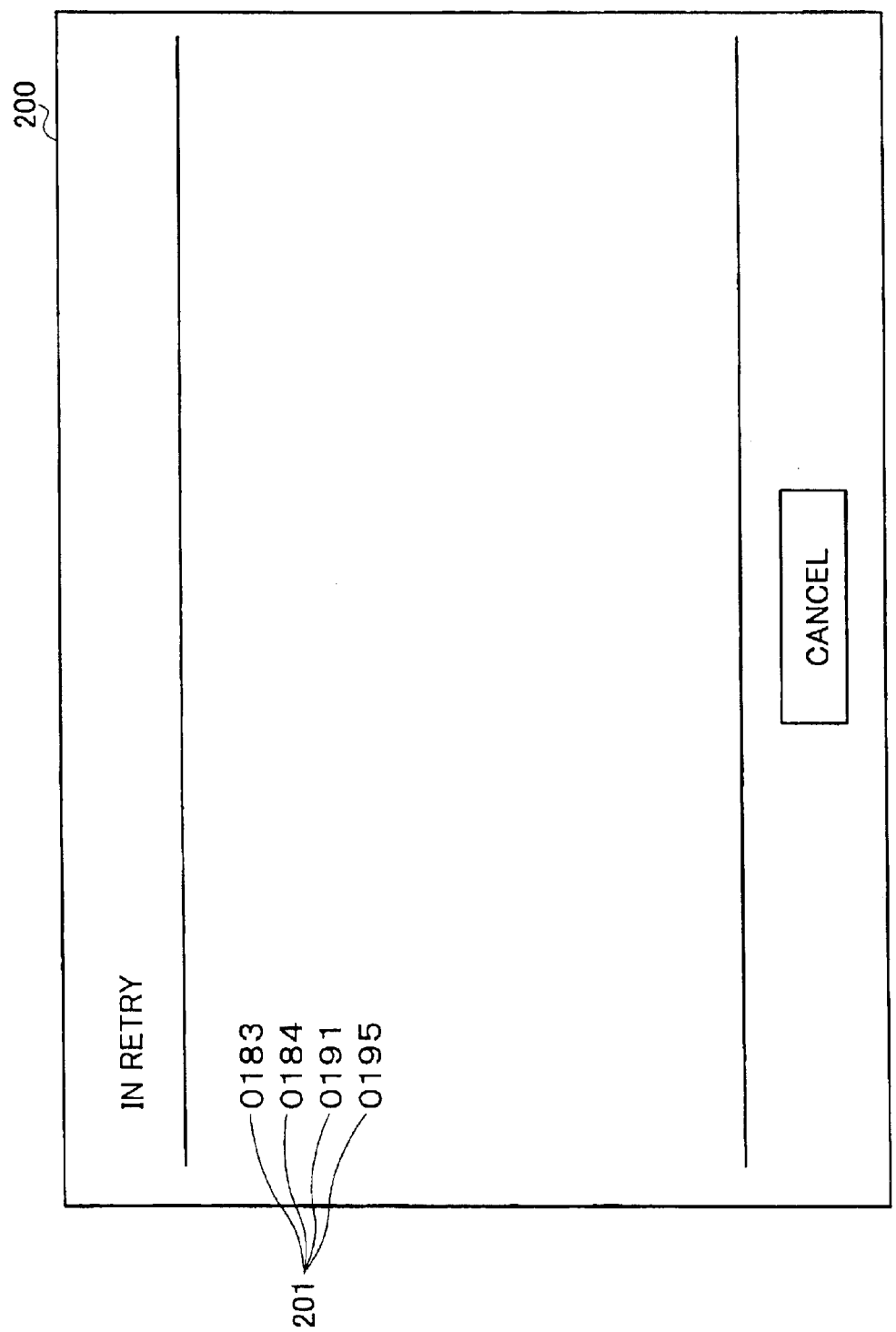
FIG. 15 is a view showing one example of a Web page of the relay apparatus according to a fourth embodiment.

In the fourth embodiment, as shown in FIG. 15, Web page generating/registering section 111 generates Web page 200 in which file numbers 201 of FAX data in the retry are listed in place of Web page 121 shown in FIG. 12. In other words, the relay apparatus of the fourth embodiment converts e-mail text main body and/or TIFF file to FAX data, adds the file numbers to the FAX data, and stores the resultant to FAX transmission data storage memory 37. Thereafter, the relay apparatus adds the file numbers to Web page 200. Thereafter, the relay apparatus transmits the busy notification mail in which URL of Web page 200 is described to the request source.

Figure 16:
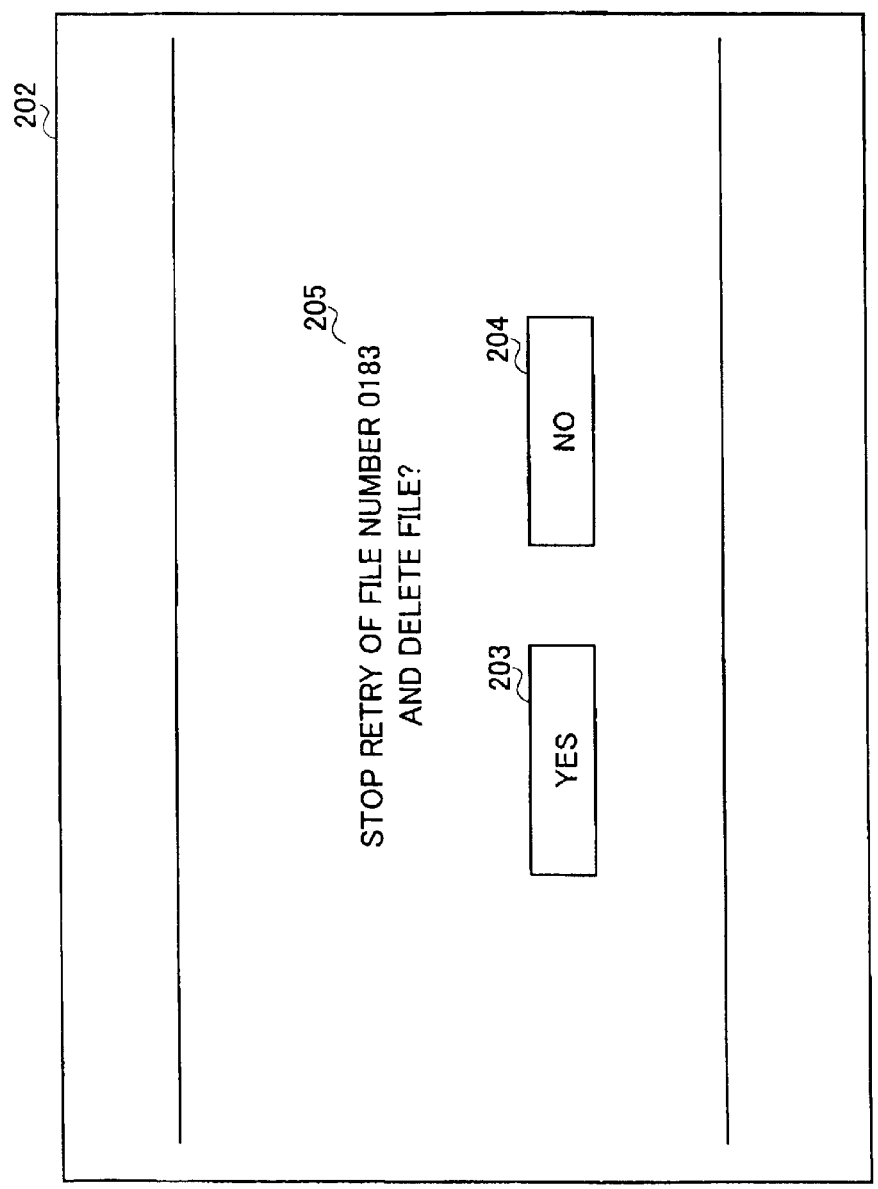
FIG. 16 is a view showing one example of a Web page for a delete operation of the relay apparatus according to the fourth embodiment.

The request source wishes to stop the retry to delete FAX data, the request source clicks the file number described in the busy notification mail. The file number is linked to Web page 202 for deletion operation as shown in FIG. 16. The request source clicks "YES" when wishing to agree to message 205 displayed on Web page 202 for deletion operation. In accordance with this operation, WWW server section 113 outputs the instructions to stop the retry and delete the file similar to the third embodiment.

The fourth embodiment brings about an effect, which enables the request source to instruct the relay apparatus to stop the retry and delete FAX data from the browser, which operates on PC 6 and the like.

Though relay apparatus 1" has WWW server section 113 built-in in the third and fourth embodiments, the WWW server may be provided separately. In other words, the present invention includes a computer system in which the respective functions of first to fourth embodiments are divided into different apparatuses and these apparatuses are combined with one another by the computer network.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, the request source, which is placed at a remote site and the like, can easily recognize whether or not the replay apparatus is retrying. Moreover, the present invention brings about an effect that enables the request source to stop the retry of relay easily and correctly.

The present invention is not limited to the above described embodiments, and various variations and modifications may be possible without departing from the scope of the present invention.

This application is based on the Japanese Patent Application No. HEI2000-142708 filed on May 16, 2000, entire content of which is expressly incorporated by reference herein.

What is claimed is:

1. A relay apparatus comprising:
   a relay request receiver that receives an e-mail message and a request for relaying the e-mail message from a request source over a computer network;
   a converter that converts said e-mail message to facsimile data;
   a facsimile transmitter that transmits said facsimile data to a facsimile apparatus, which is associated with a facsimile number designated by said request source; and
   a retry notifying processor that transmits a retry notification e-mail message to be said request source, the retry notification e-mail message notifies notifying said request source that said facsimile transmitter is retrying to transmit said facsimile data.

2. The relay apparatus according to claim 1, wherein said relay request receiver has a mail analyzer that analyzes said e-mail message to recognize a facsimile number of a final destination designated by the request source.

3. The relay apparatus according to claim 1, further comprising a retry stop processor that stops a retry operation of a facsimile controller in accordance with a retry stop instruction from the request source, the retry stop instruction being transmitted after the request source received the retry notification e-mail message.

4. The relay apparatus according to claim 3, wherein the retry stop instruction is a reply to the retry notification e-mail message.

5. The relay apparatus according to claim 4, said retry notifying processor configured to add facsimile data identification information to the retry notification e-mail message.

6. The relay apparatus according to claim 3, further comprising a server that displays a Web page for receiving the retry stop instruction from the request source.

7. The relay apparatus according to claim 6, further comprising a Web page generator that generates a Web page for displaying, to the request source, facsimile data information, which indicates that the retry operation is being executed.

8. The relay apparatus according to claim 7, wherein said Web page generator includes a Web page generator for each request source to notify the request source of a URL of the Web page.

9. A relay method comprising:

receiving an e-mail message and a request for relaying the e-mail message from a request source over a computer network;

converting the e-mail message to facsimile data;

transmitting the facsimile data to a facsimile apparatus, which is associated with a facsimile number designated by said request source; and transmitting a retry notification e-mail message to the request source, the retry notification e-mail message notifying the request source that a facsimile transmitter is retrying to transmit the facsimile data.

10. The relay method according to claim 9, wherein, in the receiving the e-mail message, the e-mail message is analyzed to recognize a facsimile number of a final destination designated by the request source.

11. The relay method according to claim 9, further comprising stopping a retry of facsimile transmission in accordance with a retry stop instruction from the request source, the retry stop instruction be transmitted after the request source received the retry notification e-mail message.

12. The relay method according to claim 11, wherein the retry stop instruction is a reply to the retry notification e-mail message.

13. The relay method according to claim 12, further comprising adding identification information to the retry notification e-mail message.

14. The relay method according to claim 11, further comprising displaying a Web page for receiving the retry stop instruction from the request source.

15. The relay method according to claim 14, further comprising generating a Web page for displaying, to the request source, facsimile data information, which indicates that the retry operation is being executed.

16. The relay method according to claim 15, wherein, the Web page generating includes generating a Web page for each request source to notify the request source of a URL of the Web page.

17. A relay apparatus connected to a transmitting Internet facsimile apparatus via the Internet and connected to a receiving facsimile apparatus via a telephone line, the relay apparatus comprising:

a receiver configured to receive an e-mail message from the transmitting Internet facsimile apparatus; and a controller configured to convert the e-mail message into image data, to transmit the converted image data to the receiving facsimile apparatus, and to retry transmission of the converted image data to the receiving facsimile apparatus when the receiving facsimile apparatus is unavailable;

the controller further being configured, when the receiving facsimile apparatus is unavailable, to transmit, to the transmitting Internet facsimile apparatus, an e-mail message indicating that the relay apparatus is retrying transmission of the converted image data to the receiving facsimile apparatus.

18. The relay apparatus according to claim 17, wherein the controller converts text data in a main body of the e-mail message into image data.

19. The relay apparatus according to claim 17, wherein the controller converts data attached to the e-mail message into image data.

20. The relay apparatus according to claim 17, wherein the controller determines that the receiving facsimile apparatus is unavailable when the receiving facsimile apparatus is busy.

21. The relay apparatus according to claim 17, wherein the controller stops retrying transmission of the converted image data to the receiving facsimile apparatus when the controller receives an instruction to stop retrying the transmission, from the transmitting Internet facsimile apparatus.

22. The relay apparatus according to claim 21, wherein the instruction to stop retrying the transmission is a reply to the e-mail message indicating that the relay apparatus is retrying transmission of the converted image data to the receiving facsimile apparatus.

23. The relay apparatus according to claim 17, wherein the controller further generates a Web page configured such that a user of the transmitting Internet facsimile apparatus can confirm the status of the transmission, by the relay apparatus, of the converted image data to the receiving facsimile apparatus.

24. The relay apparatus according to claim 23, wherein the Web page comprises a key that stops the transmission.

25. A relay method for controlling a relay apparatus connected to a transmitting Internet facsimile apparatus via the Internet and connected to a receiving facsimile apparatus via a telephone line, the relay method comprising:

receiving an e-mail message from the transmitting Internet facsimile apparatus;

converting the e-mail message into image data;

transmitting the converted image data to the receiving facsimile apparatus;

retrying transmission of the converted image data to the receiving facsimile apparatus when the receiving facsimile apparatus is unavailable; and transmitting, to the transmitting Internet facsimile apparatus, an e-mail message indicating that the relay apparatus is retrying transmission of the converted image data to the receiving facsimile apparatus, when the receiving facsimile apparatus is unavailable.

* * * * *